July 22, 1958  I. V. K. HOTT  2,844,218
LIFT
Filed Dec. 22, 1955  2 Sheets-Sheet 2
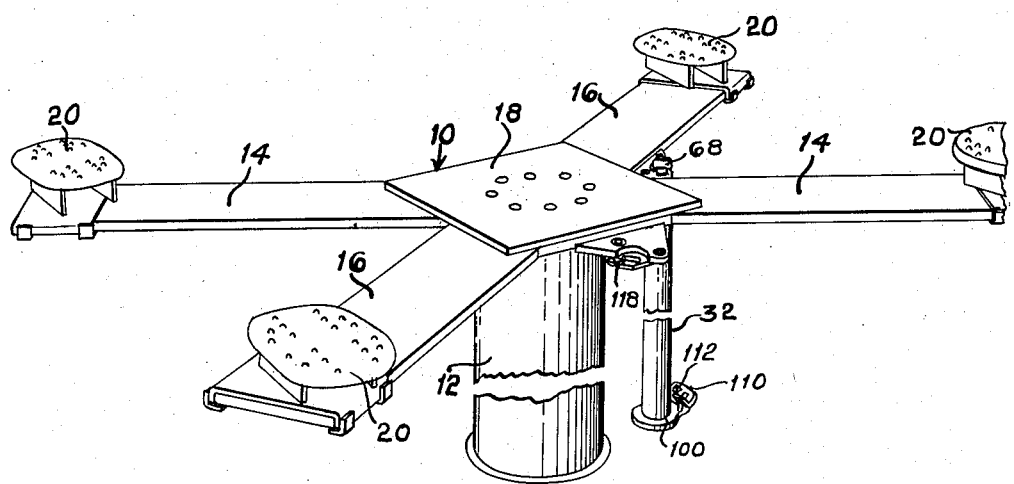
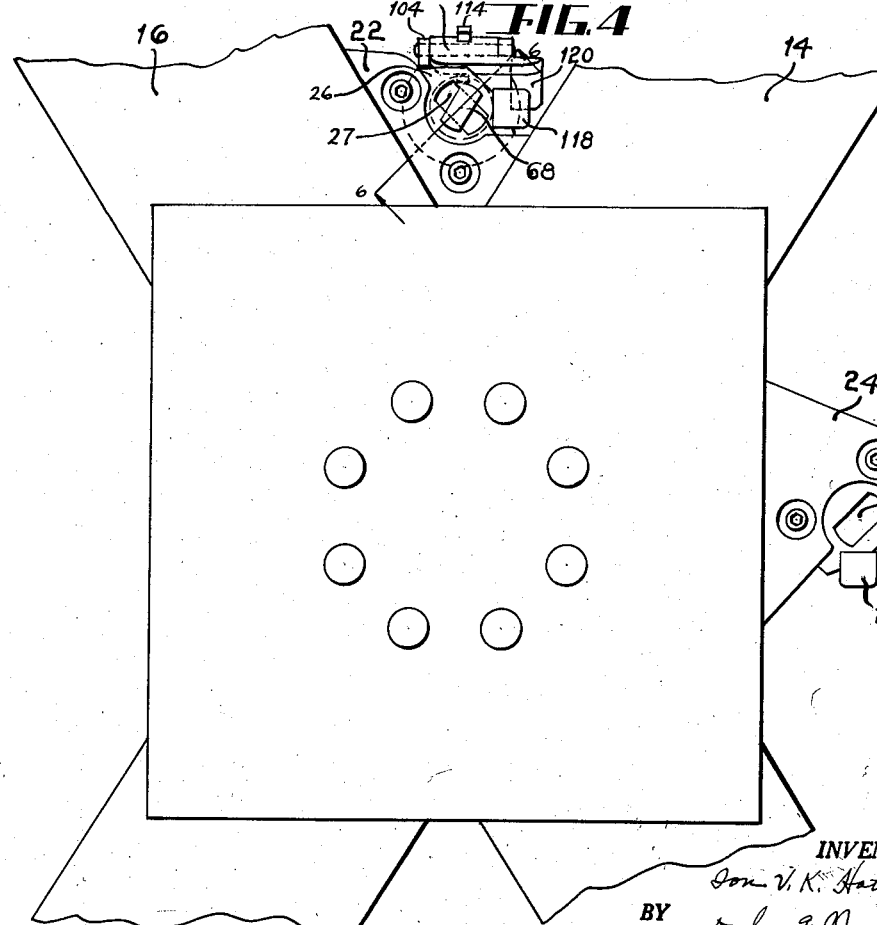
INVENTOR.
Ion V. K. Hott
BY
HIS ATTORNEYS

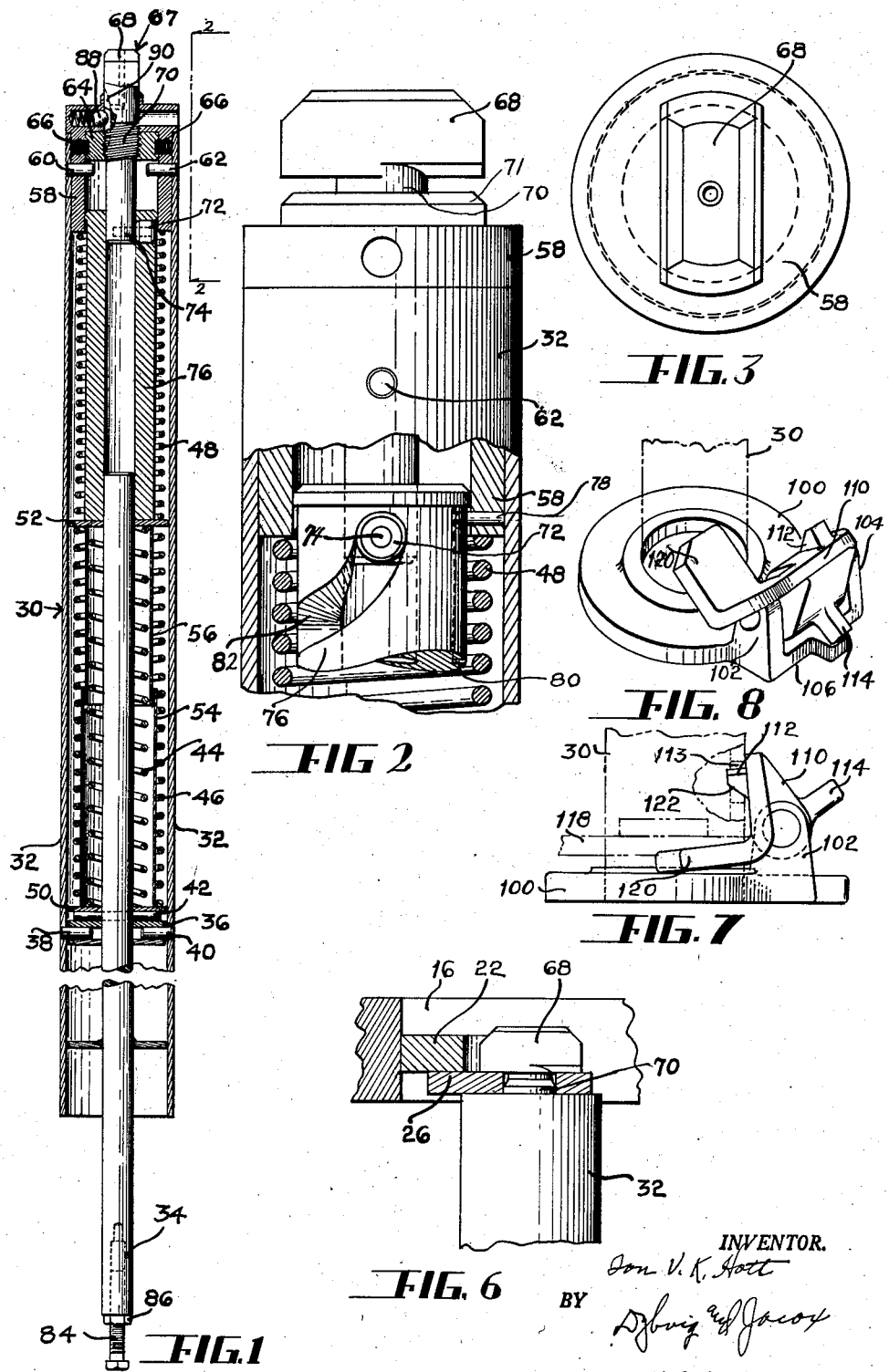

United States Patent Office 2,844,218
Patented July 22, 1958

2,844,218

LIFT

Ion V. K. Hott, Dayton, Ohio, assignor to The Joyce-Cridland Company, a corporation of Ohio Application December 22, 1955, Serial No. 554,771

8 Claims. (Cl. 187—8.49)

This invention relates to a single post lift superstructure for engaging the under side of automobiles and other vehicles and more particularly to a rotatable lift superstructure and combined means for stopping rotation, although not necessarily so limited.

In the design of lifts for elevating automobiles and other vehicles in order to expose the under sides thereof for service and repair, a problem exists because there are so many sizes and shapes of vehicles which must be accommodated by the lift superstructure. Single post lift superstructures are currently of three general types; the X frame, designed to engage the under side of the frame of a vehicle and having supporting arms intersecting angularly to form an X-shaped superstructure; the H frame, also designed to engage the under side of the frame of a vehicle and having parallel supporting arms connected so as to form a H-shaped superstructure; and what may be termed the H-runway type, a superstructure designed to support the wheels of a vehicle and having parallel runs or tracks connected to form an H-shaped superstructure. The first two types, being designed to engage the frame of a vehicle, require support blocks projecting upwards from the superstructure arms to contact the frame. Of the three types, the frame types are often preferred because they provide greater access to the under side of the vehicle, particularly to the springs and wheels. All three types have the limitation, however, that the variety of sizes and shapes of vehicles accommodated by a particular superstructure is limited, due to variations in frame construction and wheel base dimensions.

Efforts to relieve this problem regarding frame type superstructures have centered upon modification of the support blocks which engage the vehicle frame. For example, by having support blocks which are slidable along the arms of the superstructure, the variety of vehicles accommodated by a particular superstructure may be considerably increased.

In the present invention, a further increase in superstructure adaptability is obtained by making the superstructure longer than it is wide and having the superstructure rotatable upon its support, so that the length of the superstructure may be spanned by long vehicles and the width of the superstructure may be spanned by short vehicles. Novel means are provided for locking the superstructure to prevent rotation of the superstructure while in an elevated position.

Accordingly, an object of this invention is to provide a lift superstructure for engaging the under side of automobiles and other vehicles, the superstructure being longer than it is wide and being rotatable in a horizontal plane.

Another object of this invention is to provide adjustable support blocks for engagement with frames of vehicles, the support blocks being slidable along the arms of the superstructure.

Another object of this invention is to provide a means for locking the rotatable lift superstructure in two or more different positions in the plane of rotation, the locking means serving to stop rotation of the superstructure without restricting vertical movement of the superstructure.

Other objects and advantages reside in the construction of parts, the combination thereof and the mode of operation, as will become more apparent from the following description.

The type of lift to which this invention relates is most often hydraulically operated, the lift being driven upwardly by a cylindrical piston supporting the lift. Normally, means must be provided which prevent rotation of the superstructure. However, for the purposes of this invention, these means are omitted and a novel locking device is substituted therefor.

In the drawings,

Figure 1 is a cross sectional, side elevational view of a locking post, showing the arrangement of parts within the device.

Figure 2 is an enlarged, fragmentary, side elevational, cut-away view of the locking post, taken substantially along the line 2—2 in Figure 1, with some parts in cross section.

Figure 3 is a top plan view of the locking post, drawn to the scale of Figure 2.

Figure 4 is a perspective view of a lift superstructure, drawn to reduced scale, the figure showing the locking post adjacent the superstructure.

Figure 5 is a fragmentary, plan view of the lift superstructure, showing the locking post in engagement with a complementary locking member attached to the lift superstructure.

Figure 6 is a fragmentary, side elevational view of the locking post in engagement with a locking member, with parts in cross section, the view taken along the line 6—6 of Figure 5.

Figure 7 is a side elevational view of a safety latch mechanism in locked position.

Figure 8 is a perspective view of the latch mechanism in released position.

Referring to the figures in more detail, a lift superstructure 10 supported by a hydraulically driven piston 12 comprises a pair of crossed arms 14 and 16 secured in place by a plate 18. On the ends of the arms 14 and 16 are support blocks 20 which are adapted to slide along the arms. Attached to the arms 14 and 16 adjacent the plate 18 are brackets 22 and 24 to which are secured locking members 26 and 28, these locking members being located at positions 90° apart with respect to the center of the lift superstructure. Oblong apertures 27 and 29 with arcuate ends are located in the locking members 26 and 28. A locking post 30 is adapted to engage the locking members 26 and 28. The locking post 30 comprises a vertical post 32 supported by a downwardly extending shaft 34, the shaft 34 and the vertical post 32 being resiliently coupled.

Downward travel of the shaft 34 within the vertical post 32 is limited by a washer 36, which is secured to the vertical post 32 by pins 38 and 40 and which abuts a pin 42 traversing the shaft 34. Upward travel of the shaft 34 within the vertical post 32 is restrained by the action of three springs 44, 46 and 48. The springs 44 and 46 are compressed between washers 50 and 52, the washer 50 abutting pin 42 and the washer 52 abutting the spring 48. It will be noted that the springs 44 and 46 are oppositely coiled, to prevent binding of the springs. However, binding may also be prevented by inserting a pair of telescoping sleeves 54 and 56 between the springs 44 and 46. In the form of the invention herein described, the two springs 44 and 46 perform the same function and it would be an obvious expedient to substitute a third spring for the two used, the only requirement being that the third spring have a force constant equal to the sum of the force constants of the two separate springs 44 and 46. The spring 48 is compressed between the washer 52, which abuts the springs 44 and 46, and a cap 58, which is secured to the vertical post 32 by pins 60 and 62.

A nut 64 is secured within the cap 58 by set screws 66. An engagement portion 67, comprising a beveled oblong block 68 having a downwardly extending coupling shaft 70, is threadedly coupled to the nut 64. In this manner, the engagement portion 70 is rotatably attached to the vertical post 32. Complementing the oblong block 68 in shape is a raised portion 71 integral with the cap 58 and underlying the block 68. On the lower end of the coupling shaft 70 is mounted a roller 72 having an axle 74 radially entering the shaft 70. Within the vertical post 32 is a hollow cylindrical weight 76, which is prevented from rotating by a pin 78 projecting from the cap 58 into a groove 80 running vertically in the wall of the cylindrical weight 76. A helical slot 82 travels through one quadrant in the wall of the upper portion of the weight 76, the slot 82 coupling with the roller 72, so as to suspend the weight 76 from the coupling shaft 70.

In most applications, lift devices are installed in such a manner that the lift superstructure 10 is at floor level when in an unelevated position. This requires that the supporting piston 12 and hydraulic apparatus for elevating the lift be supported by sub-flooring. In the present invention, the locking post 30 is located adjacent the lift superstructure 10 with the lower end of the locking post 30 abutting the sub-flooring when the lift superstructure 10 and locking post 30 are unelevated. In the unelevated position, it is necessary that the oblong block 68 at the top of the locking post 30 be at a level just higher than that of the locking members 26 and 28 attached to the superstructure 10.

To facilitate adjustment of the locking post 30 to the proper level, an adjustable screw member 84 is provided at the bottom of the shaft 34, the adjustment being fixed by a nut 86 which is turned tightly against the shaft 34. When the locking post 30 is unelevated, the full weight of the locking post assembly is transmitted to the shaft 34 by the pin 42; but due to the action of the springs 44 and 46, the cylindrical weight 76 is urged upwardly against the roller 72 attached to the shaft 70. The upward force exerted by the cylindrical weight 76 will tend to turn the shaft 70 clockwise, as viewed in Figures 1 and 2, through the action of the helical slot 82 upon the roller 72. To retard this action, a spring loaded ball bearing assembly 88, recessed in the cap 58, engages a depression 90 in the coupling shaft 70. The action of the ball bearing assembly 88 is not so positive that the shaft 70 will not be rotated by the action of the helical slot 82 upon the roller 72 when the locking post assembly is depressed beyond its normal rest position against the action of the springs 44 and 46.

*Mode of operation*

When both the lift superstructure 10 and the locking post 30 are unelevated, the lift superstructure 10 is rotated to either of two positions 90° apart, so that one of the apertures, for example 27, is directly above the locking post 30 and in registry with the oblong block 68. The oblong block 68 is then projected through the aperture 27 by lowering the lift superstructure hydraulically until the locking member 26 abuts the cap 58 of the locking post assembly and the raised portion 71 is disposed within the aperture 27. Continued downward movement of the superstructure 10 will depress the locking post assembly against the action of the springs 44 and 46 whereupon the spring loaded ball bearing assembly 88 will yield and the coupling shaft 70 will rotate clockwise as the cylindrical weight 76 pushes upward. It will be noted that three effects accompany the rotation: (1) the spring loaded ball bearing 88 is disengaged from the depression 90 in the coupling shaft 70; (2) the oblong block 68 clamps against the locking member 26 through the action of the threaded coupling between the shaft 70 and the nut 64; and (3) the cylindrical weight 76 is permitted to rise a short distance determined by the helical slot 82.

If the superstructure 10 is now elevated hydraulically, the locking post 30 will be carried up with the superstructure 10 and will no longer be supported by the sub-flooring, but will hang from the locking member 26 to which it is attached. When the superstructure is in a raised position, the full weight of the locking post 30 is suspended from the oblong block 68 creating a frictional bond between the oblong block 68 and the locking member 26. This frictional bond prevents any rotation of the oblong block 68 thereby insuring that the locking post 30 cannot be disengaged from the superstructure 10.

When the superstructure 10 is lowered back to floor level, the bolt 84, projecting from the shaft 34, contacts the sub-flooring and the locking post 68 can now be disengaged by manually rotating the oblong block 68. However, due to the action of the helical slot 82 in the cylindrical weight 76, which is urged upwardly by the springs 44 and 46, rotation of the oblong block 68 can be accomplished only by lowering the weight 76 against the action of the springs 44 and 46. Since this requires effort, the locking post 30 cannot be unintentionally disengaged.

Throughout this description, the scope of the invention has been confined to a pair of locking members attached to the superstructure 90° apart. It is recognized, however, that in some installations there would be an advantage to having more than two locking members located, perhaps, at positions other than 90° apart in the plane of rotation. Further, though the discussion has been related specifically to X-frame lifts, the principle is equally adaptable to other types of lifts, particularly frame type lifts, the adaptability of the superstructure being greatest when the superstructure is longer than it is wide.

The vertical post 32 may be locked in any adjusted position by any suitable locking mechanism, as, for example the latch mechanism shown in Figures 4 and 5 and in detail in Figures 7 and 8. A similar latch mechanism is claimed in the Hott application Serial No. 454,890, filed September 9, 1954, for Flush Floor Mounted Safety Latch for Hydraulic Lifts. Such locking mechanism is a safety device preventing the lift from dropping in the event of a failure of the hydraulic system.

The latch mcehanism includes a ring member 100 encircling the post 30. A pair of lugs 102 and 104 project upwardly from an extension 106 integral with the ring 100. These lugs form a support for the pivotally mounted latch 110 provided with a pawl 112 adapted to project into a hole 113 in the side of the post 30. There may be a plurality of such holes 113 provided in the locking post 30 in vertical alignment. When the pawl 112 projects into a hole in the post 30, the post 30 cannot be lowered. When it is found desirable to lower the hoist, the attendant first raises the hoist slightly, so as to release the weight from the pawl 112. Then he merely actuates the latch member by stepping on the pedal 114, so as to orient the latch member from the position shown in Figure 7 into the position shown in Figure 8. When the hoist is actuated into the down position, a tab 118, welded or fixedly secured to member 28, engages the extension 120 of the latch member, so as to reset the latch.

Due to the inclined surface 122 on the under side of the pawl 112, it can readily be seen that the post 30 may be raised and one or more holes in the post may pass the pawl 112 without interference from the pawl. The pawl merely drops in and is ejected from the hole by the lower margin of the hole engaging the inclined surface 122. The center of gravity of the latch member is such that the end of the pawl 112 rides against the side of the post while the post is being raised, the latch member 110 automatically causing the pawl 112 to drop into the proper hole at the proper time. When the latch member 112 is seated in the hole, it is impossible for the post 30 to be lowered and, that being the case, it is impossible for the hoist to be lowered, in spite of the fact that there may be a failure in the hydraulic system used in raising and lowering the post.

The post 32 may extend down to the sub-flooring or it may be mounted in a tubular casing, not shown, attached to the under side of the ring 58 and having a bottom against which the screw 84 may project.

From this it can readily be seen that the post 30 has a dual function, in that it prevents rotation of the X-frame and the piston 12. It also provides a safety mechanism, preventing the accidental dropping of the hoist in the event of a failure in the hydraulic system.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The combination with a lift superstructure having a plurality of arms fixedly mounted upon a hydraulic piston, said arms being adapted for engaging the under side of automobiles and other vehicles, said superstructure with the piston being rotatable on a vertical axis, said superstructure being longer than it is wide, of means including a post mounted for movement with the superstructure only along a fixed vertical axis for locking said superstructure in a plurality of positions in the plane of rotation.

2. The combination with a lift superstructure for engaging the under side of automobiles and other vehicles, said superstructure being rotatable upon a vertical axis and having a down position and raised positions, said superstructure being longer than it is wide, of means for locking said superstructure in two positions 90° apart in the plane of revolution, said means comprising a pair of locking members integral with the superstructure, said locking members being spaced 90° apart in the plane of revolution, and a vertical locking post mounted for reciprocal vertical movement along a fixed vertical axis adjacent said superstructure, said locking post including a portion engaging one of the locking members thereby securing the locking post to the superstructure.

3. A vertically extending locking post for preventing rotational motion while permitting vertical motion of a lift device of the type described having a down position and raised positions and having integral locking members, said locking post comprising a portion for engaging the locking members, weight means biasing the engagement portion into a locking position when the superstructure is in the down position, and means for counteracting the weight means when the engagement portion is not in a locking position.

4. A locking post according to claim 3, wherein the weight means includes a resiliently mounted cylindrical weight having a helical slot therein, and the engagement portion has a roller mounted thereon, said roller being adapted to move within the helical slot, said roller and said helical slot cooperating to limit and bias the movement of the engagement portion.

5. The combination with a lift superstructure for engaging the underside of automobiles and other vehicles, said superstructure being rotatable upon a vertical axis and having a down position and raised positions, said superstructure being longer than it is wide, of means for locking said superstructure in two positions 90° apart in the plane of revolution, said means comprising a pair of locking members integral with the superstructure, said locking members being spaced 90° apart in the plane of revolution, and a vertically movably mounted locking post adjacent said superstructure, said locking post including a portion engaging one of the locking members and weight means biasing the portion engaging the locking members into a locking position when the superstructure is in the down position thereby securing the locking post to the superstructure.

6. The combination with a lift superstructure for engaging the underside of automobiles and other vehicles, said superstructure being rotatable on a vertical axis, of means for locking said superstructure in a plurality of positions in the plane of rotation, said means comprising a vertically movably mounted locking post adjacent said superstructure, a plurality of locking members carried by said superstructure, said locking post having a complementary portion engageable selectively with one of said locking members, and weight means biasing said complementary portion into locking position when the superstructure is in the down position thereby securing the locking post to the superstructure.

7. A vertically extending locking post for preventing rotational motion while permitting vertical motion of a lift device of the type described having a down position and raised positions and having integral locking members, said locking post comprising a vertically disposed shaft adapted to engage a subflooring for the lift superstructure, a hollow post enclosing the upper portion of said shaft, first resilient means supporting said post in an elevated position upon said shaft, said resilient means permitting reciprocal vertical movement of said post on said shaft, a hollow cylindrical weight journalled within said hollow post for reciprocal movement on said shaft relative to said hollow post, said weight being keyed to said post so as to be non-rotatable relative to said post, said weight having a helical slot in the wall thereof, locking means engageable with the locking members of said superstructure threadedly engaging the top of said hollow post, said locking means projecting into said hollow post and including a roller element engageable with the helical slot in said weight, said locking means being rotatable relative to said hollow post between two extreme positions, one position for locking engagement with a locking member of said superstructure and the other for disengaging the locking members of said superstructure, and second resilient means urging said weight upwardly relative to said shaft, the construction and arrangement being such that said weight being normally urged upwardly by said second resilient means coacts with said roller element to rotate said locking means to the position for locking engagement.

8. The locking post according to claim 7, including detent means engaging said locking means for opposing the rotation of said locking means away from the position of disengagement with the locking members of said superstructure.

References Cited in the file of this patent

UNITED STATES PATENTS

| | | |
|---|---|---|
| 1,938,550 | Todd | Dec. 5, 1933 |
| 1,993,447 | Hott | Mar. 5, 1935 |
| 2,503,590 | Ormsby | Apr. 11, 1950 |
| 2,608,381 | Pelouch | Aug. 26, 1952 |

FOREIGN PATENTS

| | | |
|---|---|---|
| 497,847 | Belgium | Sept. 15, 1950 |